US009106415B2

(12) United States Patent
Sturkovich et al.

(10) Patent No.: US 9,106,415 B2
(45) Date of Patent: Aug. 11, 2015

(54) MICROWAVE BACKHAUL SYSTEM HAVING A DOUBLE CAPACITY LINK

(71) Applicant: Broadcom Corporation, Irvine, CA (US)

(72) Inventors: Kobi Sturkovich, Netanya (IL); Igal Kushnir, Azur (IL)

(73) Assignee: Broadcom Corporation, Irvine, CA (US)

( * ) Notice: Subject to any disclaimer, the term of this patent is extended or adjusted under 35 U.S.C. 154(b) by 75 days.

(21) Appl. No.: 13/626,108

(22) Filed: Sep. 25, 2012

(65) Prior Publication Data
US 2013/0136039 A1 May 30, 2013

Related U.S. Application Data

(60) Provisional application No. 61/565,469, filed on Nov. 30, 2011.

(51) Int. Cl.
H04J 3/00 (2006.01)
H04L 5/14 (2006.01)
(Continued)

(52) U.S. Cl.
CPC .............. *H04L 5/143* (2013.01); *H04L 5/1461* (2013.01); *H04L 27/02* (2013.01); *H04L 27/368* (2013.01)

(58) Field of Classification Search
CPC ......... H04L 5/14; H04L 5/1423; H04L 25/22; H04L 5/16; H04L 29/06068; H04L 29/06095; H04W 84/12; H04W 80/04
USPC ......... 370/280, 281, 338, 328, 276, 277, 216; 375/222, 220, 219; 455/517, 452.1, 455/67.11
See application file for complete search history.

(56) References Cited

U.S. PATENT DOCUMENTS 5,548,807 A 8/1996 Ueda
5,640,691 A 6/1997 Davis et al.
(Continued)

FOREIGN PATENT DOCUMENTS

CN 1735999 A 2/2006
CN 101317332 A 12/2008
(Continued)

OTHER PUBLICATIONS

CPRI Specification V5.0—Common Public Radio Interface (CPRI); Interface Specification, Ericsson AB, Huawei Technologies Co. Ltd, NEC Corporation, Alcatel Lucent and Nokia Siemens Networks GmbH & Co. KG, pp. 1-119, Sep. 21, 2011.
(Continued)

*Primary Examiner* — Chi Pham
*Assistant Examiner* — Alexander O Boakye
(74) *Attorney, Agent, or Firm* — Sterne, Kessler, Goldstein & Fox P.L.L.C.

(57) ABSTRACT

An all outdoor communication unit (ODU) microwave backhaul system and a split ODU microwave backhaul system, each configured to support a dual channel wireless link, are provided. Each microwave backhaul system includes an ODU having a processor configured to improve a quality of data (having a first and a second communication channel) by performing mathematical manipulation techniques on the data, a conversion, block configured to perform digital-to-analog and analog-to-digital conversions of the data, and a duplexer configured to facilitate substantially simultaneous communication of the first and second communication channels over the dual channel wireless link by optimizing a frequency separation between the first and second communication channels. Each microwave backhaul system also includes a modem assembly, located at either the ODU or at an indoor communication unit (IDU), which is configured to substantially simultaneously drive the first and second communication channels over the dual channel wireless link.

20 Claims, 9 Drawing Sheets

(51) Int. Cl.
*H04L 27/02* (2006.01)
*H04L 27/36* (2006.01)

(56) References Cited

U.S. PATENT DOCUMENTS

| | | |
|---|---|---|
| 5,987,060 A | 11/1999 | Grenon et al. |
| 6,144,165 A | 11/2000 | Liedenbaum |
| 6,731,946 B1 * | 5/2004 | Stanwood et al. ............ 455/517 |
| 6,782,211 B1 | 8/2004 | Core |
| 7,643,512 B2 | 1/2010 | Gorsetman et al. |
| 7,839,842 B2 | 11/2010 | Zhang et al. |
| 7,856,048 B1 | 12/2010 | Smaini et al. |
| 8,018,375 B1 | 9/2011 | Alexopoulos et al. |
| 8,095,088 B2 | 1/2012 | Shen et al. |
| 8,488,970 B2 | 7/2013 | Huang et al. |
| 2003/0043077 A1 | 3/2003 | Alexopoulos et al. |
| 2003/0137329 A1 | 7/2003 | Van Der Valk et al. |
| 2003/0152140 A1 | 8/2003 | Antoniak |
| 2003/0156668 A1 | 8/2003 | Atkinson et al. |
| 2004/0106380 A1 | 6/2004 | Vassiliou et al. |
| 2004/0203528 A1 | 10/2004 | Ammar et al. |
| 2005/0124307 A1 | 6/2005 | Ammar et al. |
| 2006/0098614 A1 | 5/2006 | Moon et al. |
| 2007/0069901 A1 | 3/2007 | Tuck et al. |
| 2007/0129031 A1 | 6/2007 | Newton et al. |
| 2008/0002581 A1 | 1/2008 | Gorsetman et al. |
| 2008/0014866 A1 | 1/2008 | Lipowski et al. |
| 2008/0287076 A1 | 11/2008 | Shen et al. |
| 2009/0115757 A1 | 5/2009 | Bae |
| 2009/0124213 A1 | 5/2009 | Rubin et al. |
| 2009/0152445 A1 | 6/2009 | Gardner |
| 2009/0168864 A1 | 7/2009 | Teramoto |
| 2009/0232257 A1 | 9/2009 | Bury |
| 2010/0067476 A1 | 3/2010 | Periyalwar et al. |
| 2010/0272163 A1 | 10/2010 | Prager et al. |
| 2011/0051654 A1 | 3/2011 | Blankenship et al. |
| 2011/0080985 A1 | 4/2011 | Secker et al. |
| 2011/0286552 A1 | 11/2011 | Briand |
| 2012/0083304 A1 | 4/2012 | Yang et al. |
| 2012/0093100 A1 | 4/2012 | Qin et al. |
| 2012/0195392 A1 | 8/2012 | Kushnir et al. |
| 2012/0220246 A1 | 8/2012 | Kushnir et al. |
| 2012/0307695 A1 | 12/2012 | Yehezkely et al. |
| 2013/0094554 A1 | 4/2013 | Kennard |
| 2013/0113650 A1 | 5/2013 | Behbahani et al. |
| 2013/0128936 A1 | 5/2013 | Kennard et al. |
| 2013/0135985 A1 | 5/2013 | Friedmann et al. |
| 2013/0135986 A1 | 5/2013 | Sturkovich et al. |
| 2013/0136163 A1 * | 5/2013 | Friedmann et al. ............ 375/220 |
| 2013/0137381 A1 | 5/2013 | Vassiliou et al. |
| 2013/0178177 A1 | 7/2013 | Kushnir et al. |

FOREIGN PATENT DOCUMENTS

| | | |
|---|---|---|
| CN | 101465705 A | 6/2009 |
| CN | 101771441 A | 7/2010 |
| CN | 102255119 A | 11/2011 |
| EP | 1298848 A2 | 4/2003 |
| EP | 1 962 431 A1 | 8/2008 |
| EP | 2 299 775 AI | 3/2011 |
| JP | 4462043 B2 | 7/2006 |
| JP | 2011/199880 A | 10/2011 |
| TW | 1335156 B | 12/2010 |
| WO | WO 2004/064197 | 7/2004 |
| WO | WO 2011/032790 A1 | 3/2011 |

OTHER PUBLICATIONS

IEEE Standard for Information Technology—Telecommunications and Information Exchange Between Systems—Local and Metropolitan Area Networks—Specific Requirements, Version 802.3-2008 (Revision of 802.3-2005), Part 3: Carrier Sense Multiple Access with Collision Detection (CSMA/CD) Access Method and Physical Layer Specifications, Section 4, pp. 1-586, IEEE Piscataway NJ, 2008.

Kuwano, S. et al., "Digitized Radio-over-Fiber (DROF) System for Wide-Area Ubiquitous Wireless Network," MWP '06: International Topical Meeting on Microwave Photonics, 4 pages, 2006.

Partial Search Report for European Application No. EP 12 00 6163, European Patent.Office, Munich, Germany, 9 pages, mailed on Apr. 3, 2013.

Office Action for related Taiwanese Patent Application No. 1 01133022, mailed Mar. 24, 2014; 8 pages.

Office action directed to related Korean Patent Application No. 10-2012-0103653, mailed Apr. 22, 2014; 8 pages.

English-language Abstract of Japanese Patent No. 4462043 B2; 1 page, Jul. 27, 2006.

Communication from the Examining Division of the European Patent Office, directed to related European Patent Application No. 12 006 163.5, mailed Mar. 11, 2014; 9 pages.

Office Action directed to related Chinese Patent Application No. 201210372182.6, mailed Jul. 2, 2014; 7 pages, and dated Jul. 2, 2014.

Office Action directed to related Taiwanese Patent Application No. 101133671, mailed Jul. 17, 2014; 6 pages.

"Fixed Radio Systems; Point-to-Point Equipment; Presenting Important Aspects of the Spatial Frequency Reuse Method; DTR/TM-4153", European Telecommunications Standards Institute, Nov. 23, 2006, Valbonne, France; pp. 1-35.

European Search Report directed to related European Patent Application No. 13005543.7, mailed Mar. 4, 2014; 9 pages.

Office Action directed to related Taiwanese Patent Application No. 101140962, mailed Mar. 24, 2014; 8 pages.

Office Action directed to related Chinese Patent Application No. 201210501036.9, mailed Sep. 24, 2014; 6 pages.

English-language Abstract of Japanese Patent No. 4462043 B2, Jul. 27, 2006; 1 page.

English-Language Abstract for Chinese Patent Publication No. CN 101771441 A, published Jul. 7, 2010; 2 pages.

Office Action directed to related Chinese Patent Application No. 201210372182.6, mailed on Feb. 2, 2015; 8 pages.

* cited by examiner

MICROWAVE BACKHAUL SYSTEM HAVING A DOUBLE CAPACITY LINK

CROSS REFERENCE TO RELATED APPLICATIONS

This application claims the benefit of U.S. Provisional Patent Application No. 61/565,469, filed Nov. 30, 2011, which is incorporated herein by reference in its entirety.

BACKGROUND OF THE INVENTION

1. Field of the Invention

The invention generally relates to microwave backhaul architecture, and more specifically to a microwave backhaul architecture supporting a double capacity link.

2. Related Art

Conventional microwave backhaul architectures are generally implemented as either a split outdoor unit (split ODU) configuration or an all outdoor unit (all ODU) configuration. Conventional split ODU configurations are generally comprised of both an indoor unit (IDU) and an outdoor unit (ODU), where the IDU and the ODU are connected over a single channel coaxial interconnect. The IDU in a conventional split ODU configuration typically includes a modem, a digital-to-analog converter and a baseband-to-intermediate frequency converter. Under normal operation, these conventional split ODU configurations generally involve transmitting an analog signal, at an intermediate frequency, over the single channel coaxial interconnect between the IDU and the ODU. However, during this transmission, the analog signal can be subjected to various errors, which can result from deficiencies associated with the IDU. Additionally, the lack of digital capabilities of these conventional ODUs generally render them ineffective in terms of correcting the errors within the analog signal.

Moreover, the ODU implemented within these convention split ODU configurations are generally only capable of transmitting a single channel over a wireless link. In particular, transmitting more than one channel through a conventional ODU and over the wireless link typically causes difficulties from a linearity perspective. For example, cross modulation products from the multiple channels generally will not meet noise floor European Telecommunications Standards Institute (ETSI) standards. Consequently, these conventional split ODU configurations are further rendered inefficient because they are only capable of supporting a single channel wireless link having a relatively low capacity. Therefore, as the demand for higher capacity mobile backhaul networks continues to increase, the limitations associated with these conventional split ODU configurations will only become more problematic.

In particular, mobile backhaul providers are experiencing a growing demand for increased capacity as well as a shift from voice services to data services. These Factors are driving mobile backhaul networks towards high capacity IP/Ethernet connections. Additionally, the transition to 4G and LTE networks is also driving the need for higher capacity, and moving more packet traffic onto mobile backhaul networks. As a result, the limitations of conventional split ODU configurations, which only support a single channel (relatively low capacity) link, make it increasingly difficult to meet these increasing user demands.

In some instances, all ODU configurations have been used as an alternative to these conventional split ODU configurations. Conventional all ODU configurations include only an ODU, and thus do not include an IDU. The ODU therefore includes a modem, a digital-to-analog converter as well as a baseband-to-radio frequency converter. Implementing all of these functional components in the ODU typically provides some digital capabilities within the ODU, and also typically allows for the implementation of digital connectivity within these conventional all ODU configurations. This is in contrast to the typical ODU utilized in the conventional split ODU configuration, which, generally lacks digital capabilities, and generally utilizes analog connectivity. However, the conventional all ODU configurations are also subject to the limitations described above. For example, conventional all ODU configurations are still generally only capable of transmitting a single channel over the wireless link. Consequently, similar to the conventional split ODU configurations, these conventional all ODU configurations are also rendered inefficient because they are only capable of supporting a single channel wireless link, which results in the wireless link having a relatively low capacity.

Thus, neither conventional split ODU configurations nor all ODU configurations effectively meet the increasing demands for capacity.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1A:
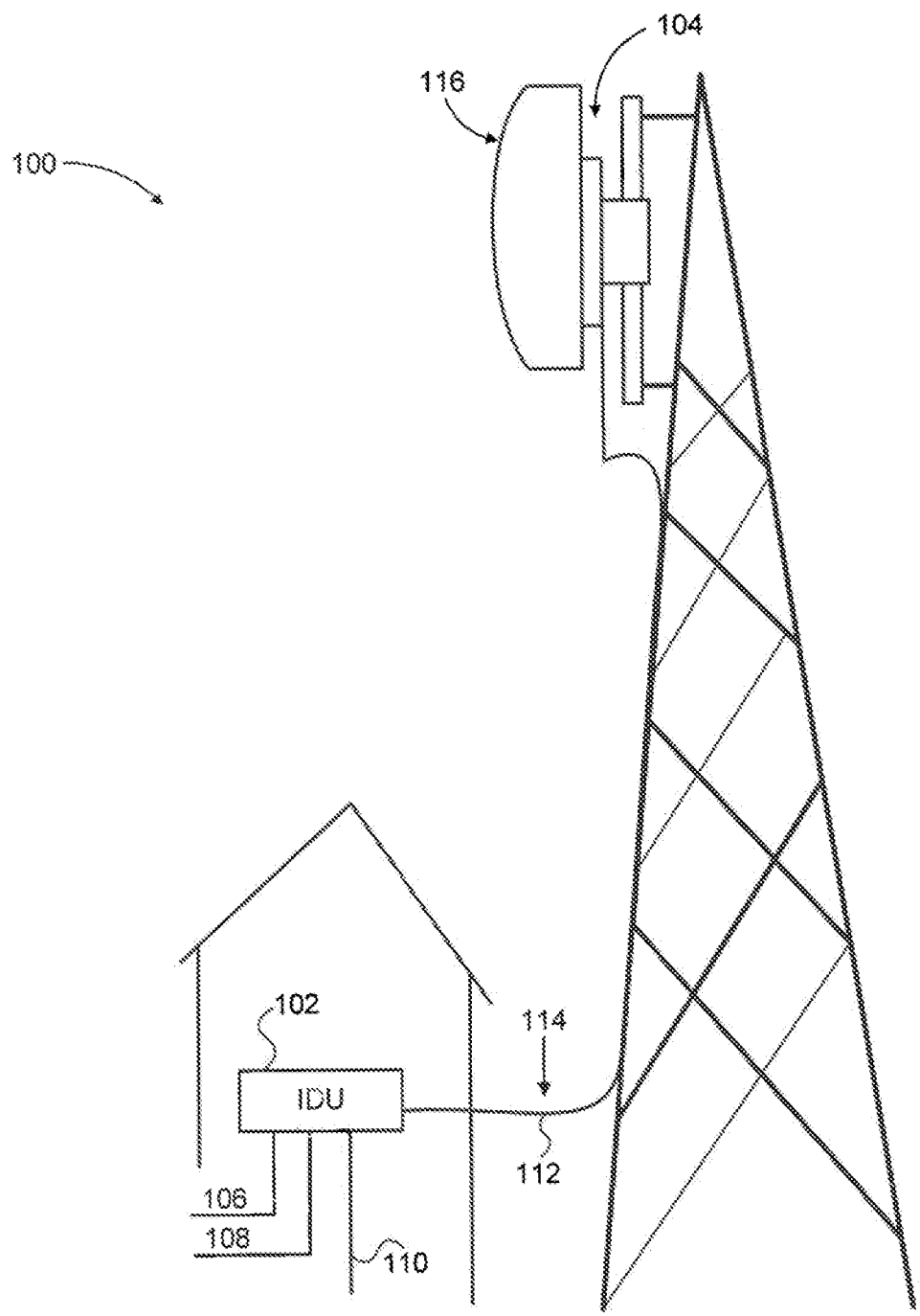
FIG. 1A illustrates a block diagram of a split outdoor communication unit (ODU) microwave backhaul system according to an exemplary embodiment of the present disclosure.

Embodiments of the disclosure will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

An Exemplary Split ODU Microwave Backhaul System

FIG. 1A illustrates a block diagram of a split outdoor communication unit (ODU) microwave backhaul system 100 that includes an indoor communication unit (IDU) 102 and an ODU 104 according to an exemplary embodiment of the present disclosure. Microwave, as used throughout this disclosure, refers to both terrestrial point-to-point (PtP) radio communications, as well as point-to-multipoint communications, and can include both wired and/or wireless communications.

Split ODU microwave backhaul system 100 initiates communication by accessing an information source, which can comprise, for example, audio data 106, video data 108, or any other data capable of being transmitted over an Internet Protocol OP)/Ethernet connection 110. To facilitate this communication, IDU 102 is coupled to a core network. In particular, IDU 102 is configured to acquire one or more sequences of digital data (e.g., audio data 106, video data 108, data transmitted over IP/Ethernet connection 110, or the like) from a core network. IDU 102 can also be configured to support several additional services, such as Ethernet, time-division multiplexing (TDM), and control data that is aggregated over a radio link.

IDU 102 can be implemented at a location that is substantially removed from ODU 104, such as at a location at ground level. For example, IDU 102 can be positioned inside of a home or an office building, or the like. Conversely. ODU 104 can be implemented at a substantially elevated location, such as on top of a pole, on top of an antenna tower, on top of a building, or the like. In some embodiments, IDU 102 and ODU 104 can be separated by a distance up to approximately 300 meters; however other distances are possible.

IDU 102 and ODU 104 are connected via a communication pathway 112, which is configured such that data 114 can be transmitted between IDU 102 and ODU 104. Communication pathway 112 can comprise an Ethernet cable, a fiber optic cable, a coaxial cable, an intermediate frequency (IF) cable, a twisted pair cable, a shielded cable, a category 5 cable, a category 6 cable, or one or more copper wires. Therefore, depending on a chosen communication medium, communication pathway 112 can facilitate transmission of an analog signal or a digital signal between IDU 102 and ODU 104. In some embodiments, communication pathway 112 can be a wireless communication channel. Additionally, an antenna 116 can be coupled to ODU 104, and can be positioned close to ODU 104. Therefore, split ODU microwave backhaul system 100 is implemented such that data 114 can be transmitted from IDU 102, across communication pathway 112, to ODU 104, and subsequently to antenna 116 where communication over a wireless link can then be initiated. Also, split ODU microwave backhaul system 100 is implemented such that data 114 received by antenna 116 can be transmitted from ODU 104 over communication pathway 112 to IDU 102.

As will be discussed in greater detail below, ODU 104 can be a "smart ODU." For example, ODU 104 can have digital capabilities, which can be implemented to improve the radio frequency (RF) functionalities within ODU 104. However, ODU 104 may not include all of the functionalities of a modem, which can instead be completely implemented within IDU 102 or split between the IDU 102 and ODU 104. Therefore, when ODU 104 is implemented as a "smart ODU," split ODU microwave backhaul system 100 can provide more efficient communication between IDU 102 and ODU 104. The limitations generally associated with the transmission of data in conventional split ODU configurations are eliminated because of the digital capabilities, and the corresponding improved RF functionalities, of ODU 104. For example, ODU 104 can sample data 114 received from IDU 102 and then correct any detected errors (e.g. by removing noise from data 114), which can be associated with either the IDU 102 or the communication pathway 112. ODU 104 can then process data 114 such that it can be properly transmitted over a wireless link via antenna 116.

As will also be discuss in greater detail below, the wireless link can be a dual channel wireless link, and thus can support approximately double the capacity of a wireless link associated with a conventional split ODU configuration. For example, ODU 104 can be implemented such that two channels can be substantially simultaneously transmitted from, and received at. ODU 104 over the wireless link. Therefore. ODU 104, supporting the dual channel wireless link, may eliminate the need to add a second ODU to meet increasing demands for capacity. In particular, when ODU 104 is implemented to support two communication channels, thus approximately doubling the capacity of the wireless link, split ODU microwave backhaul system 100 can effectively meet the demands of required by high capacity IP/Ethernet connections and 4G and LTE networks.

In an embodiment, ODU 104 can also correct errors associated with a signal received over a wireless link via antenna 116. Split ODU microwave backhaul system 100 can also be configured to support adaptive coding and modulation (ACM), which provides for high reliability of split ODU microwave backhaul system 100 even in extreme weather, such as wind, rain, hail, or the like.

IDU 102 includes a modem assembly, while ODU 104 includes at least some RF functionalities as well as corresponding digital capabilities.

An Exemplary all ODU Microwave Backhaul System

Figure 1B:
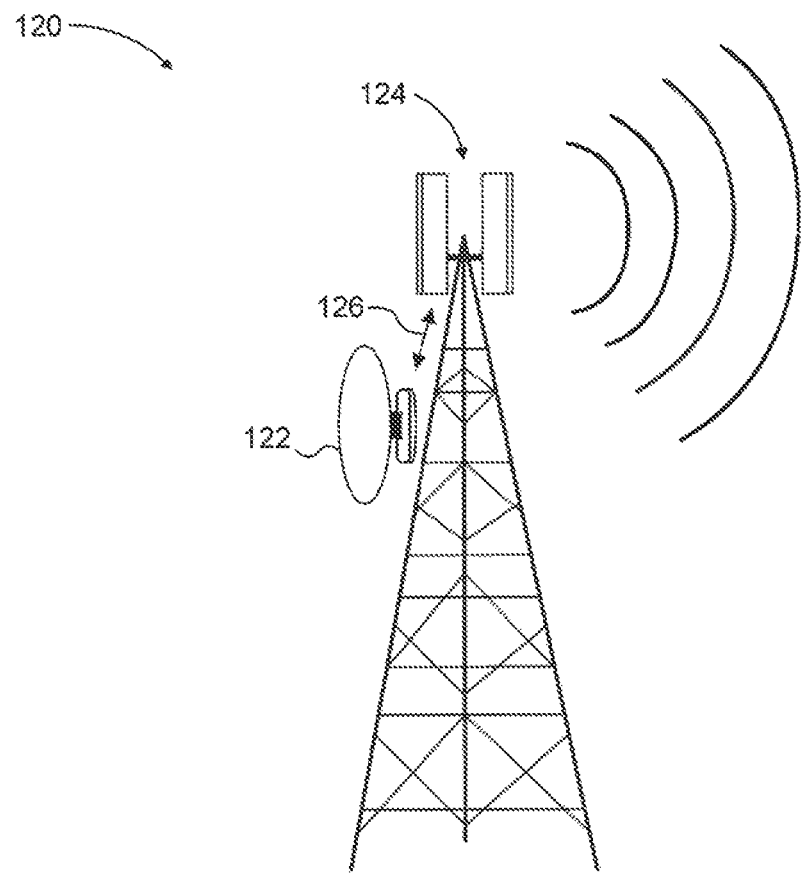
FIG. 1B illustrates a block diagram of an all ODU microwave backhaul system according to an exemplary embodiment of the present disclosure.

FIG. 1B illustrates a block diagram of an all ODU microwave backhaul system 120 that includes only an ODU 122 according to an exemplary embodiment of the present disclosure. Therefore, in contrast to split ODU microwave backhaul system 100 (see FIG. 1A), all ODU microwave backhaul system 120 does not include an IDU.

Similar to split ODU microwave backhaul system 100, all ODU microwave backhaul system 120 initiates communication by accessing an information source. However, to facilitate this communication in all ODU microwave backhaul system 120, ODU 122 is coupled to the care network. Therefore, ODU 122 is configured to acquire one or more sequences of digital data (e.g., audio data 106, video data 108, data transmitted over IP/Ethernet connection 110, or the like) directly from the core network. As with IDU 102 (see FIG. 1A), ODU 122 can also be configured to support several additional services, such as Ethernet, time-division multiplexing (TDM), and control data that is aggregated over a radio link.

In some embodiments, ODU 122 can be implemented at a substantially elevated location, such as on top of a pole, on top of an antenna tower, on top of a building, or the like. Additionally, an antenna 124 can be coupled to ODU 122, and can be positioned close to ODU 122. Therefore, all ODU microwave backhaul system 120 is implemented such that data 126 can be transmitted from ODU 122 to antenna 124, where communication over a wireless link can then be initiated. Also all ODU microwave backhaul system 120 is implemented such that data 126 received over the wireless link by antenna 124 can be transmitted to ODU 122.

As similarly discussed above with reference to ODU 104 (see FIG. 1A), ODU 122 can also be a "smart ODU." For example, ODU 122 can have digital capabilities, which can be implemented to improve the radio frequency (RP) functionalities within ODU 122. Therefore, when ODU 122 is implemented as a "smart ODU," all ODU microwave backhaul system 120 can provide for more efficient communication over the wireless link. The limitations generally associated with the transmission of data in conventional all ODU configurations are eliminated because of the digital capabilities, and the corresponding improved RF functionalities, of ODU 122. In an embodiment. ODU 122 can also correct errors associated with a signal received over a wireless link via antenna 124, ODU 122 may also be configured to digitally process data 126 such that it cart be properly transmitted over the wireless link via antenna 124.

Similar to the wireless link associated with split ODU microwave backhaul system 100, the wireless link associated with all ODU microwave backhaul system 120 can be a dual channel wireless link, and thus can support approximately double the capacity of a wireless link associated with a conventional all ODU configuration. For example, ODU 122 can be implemented such that two channels can be substantially simultaneously transmitted from, and received at, ODU 122 over the wireless link. Therefore, ODU 122 may eliminate the need to add a second ODU to meet increasing demands for capacity. In particular, when ODU 122 is implemented to support two communication channels, split ODU microwave backhaul system 120 can effectively meet the demands of required by high capacity IP/Ethernet connections and 4G and LTE networks.

Although the description of the split ODU and all ODU configurations are to be described in terms of microwave backhaul architecture, those skilled in the relevant art(s) will recognize that the present disclosure can be applicable to other architectures without departing from the spirit and scope of the present disclosure.

Figure 2:
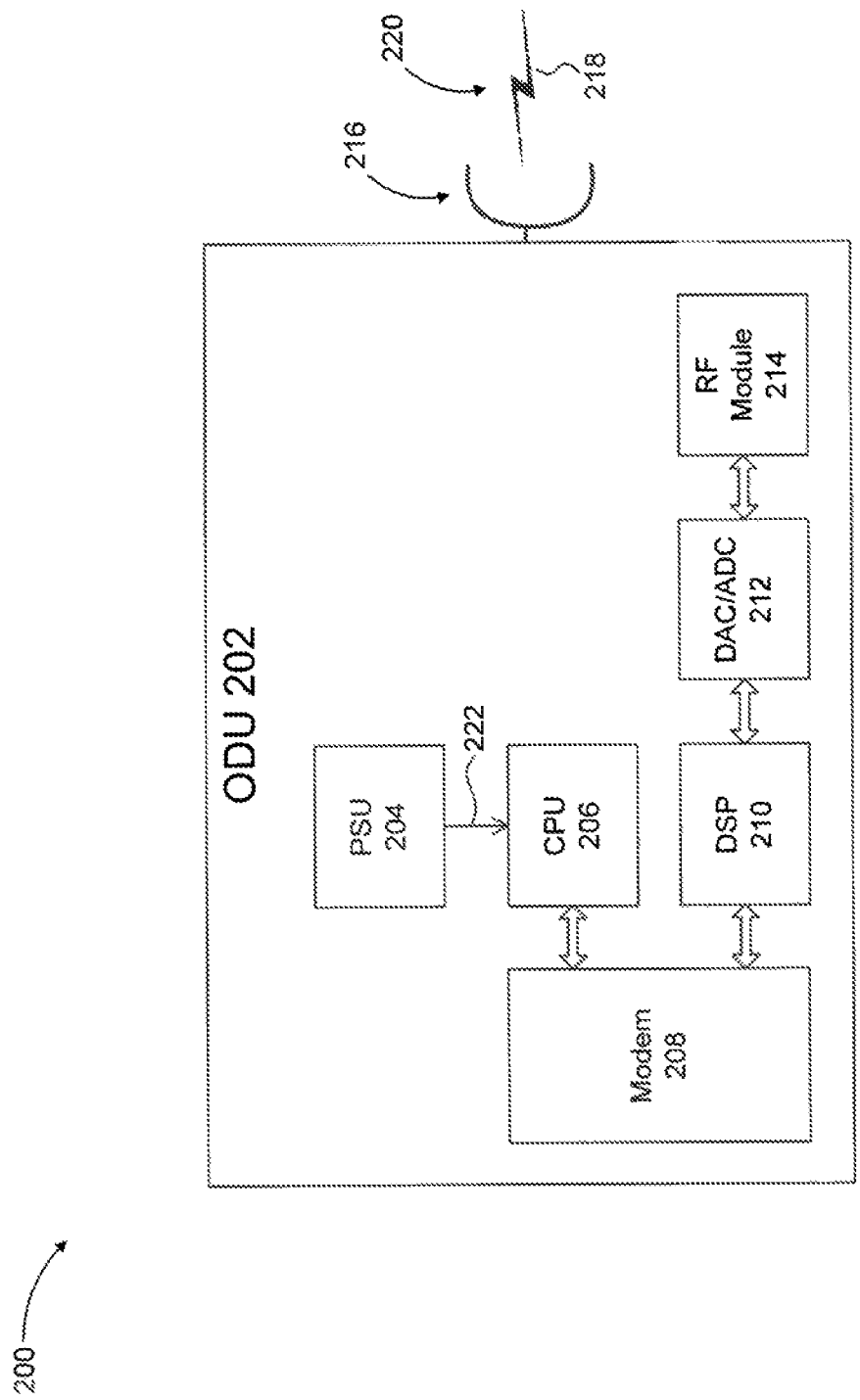
FIG. 2 illustrates a block diagram of a first ODU for implementation within an all ODU microwave backhaul system according to an exemplary embodiment of the present disclosure.

An Exemplary ODU for Implementation within an all ODU Microwave Backhaul System FIG. 2 illustrates a block diagram of a first ODU 202 for use within an all ODU microwave backhaul system 200 according to an exemplary embodiment of the present disclosure. ODU 202 can represent an exemplary embodiment of ODU 122 from FIG. 1B.

ODU 202 includes a power supply unit (PSU) 204, a CPU 206, a modem assembly 208, a digital signal processor (DSP) 210, a digital-to-analog converter/analog-to-digital converter (DAC/ADC) block 212, and a radio frequency (RF) module 220. ODU 202 may also be connected to an antenna 216, and antenna 216 may facilitate communication of data 218 over a wireless link 220.

PSU 204 is configured to produce a DC output voltage 222, which may be output to CPU 206. CPU 206 is configured to carry out instructions to perform arithmetical, logical, and/or input/output (I/O) operations of one or more of the aforementioned elements contained within ODU 202. In an embodiment. CPU 206 can control operation of modem assembly 208.

Modem assembly 2.08 is configured to perform modulation and demodulation of data 218 that is to be transmitted, and received, respectively, over wireless link 220. In some embodiments, modem assembly 208 may be implemented as a dual channel baseband modem. Additionally, modem assembly 208 may be implemented as a flexible networking system-on-chip (SoC). Modem assembly 208 can also be configured to support several additional services, such as Ethernet, time-division multiplexing (TDM), and control data that is aggregated over a radio link.

As will be discussed in greater detail below, when implemented as a dual channel modem, modem assembly 208 can facilitate relatively high capacity communication over wireless link 220. In particular, modem assembly 208 may allow wireless link 220 to have a link capacity that is approximately double the capacity of a wireless link associated with a conventional all ODU configuration. Thus, wireless link 220 may be a dual channel wireless link. For example, modem assembly 208 can be configured to drive two communication channels through a single DAC/ADC 212, such that the two communication channels can be transmitted and/or received over wireless link 220. Therefore, data 218 may comprise these two communication channels. In some embodiments, each of the two communication channels may support approximately 112 MHz wide channels, which is double the capacity for conventional microwave links.

Additionally, modem assembly 208's dual channel capabilities allow ODU 202 to support a highest possible constellation of approximately 2048 quadrature amplitude modulation (QAM); however, other QAM values are also possible. In some embodiments, modem assembly 208 may also support channel bonding by combining two or more network interfaces to increase throughput. Modem assembly 208 can also be configured to support single chip cross polarization interference cancellation (XPIC) to increase the capacity of wireless link 220. Additionally, or alternatively, modem assembly 208 can be configured to support other double capacity configurations such as multiple-input and multiple-output (MIMO) spatial multiplexing and radio optimized network planning, to provide some examples. Further, modem assembly 208 can be configured to cancel out noise that may be associated with ODU 202 or wireless link 220.

DSP 210 is configured to preform mathematical manipulation techniques on data 218, such that data 218 may be modified or improved according to a desired processing method. For example, DSP 210 can be configured to measure, filter, or compress data 218 prior to being output to DAC/ADC block 212, such that error detection and/or error correction can be performed on data 218. In an embodiment, data 218 is transmitted from modem assembly 208, to DSP 210, to DAC/ADC block 212, to RF module 214 and to antenna 216 before being transmitted across wireless link 220. Similarly, after data 218 is received, over wireless link 220, at ODU 202, data 218 traverses from antenna 216 to RF module 214, to DAC/ADC block 212, to DSP 210, and to modem assembly 208.

DAC/ADC block 212 can be configured to transmit and/or receive data from DSP 210. DAC/ADC block 212 is also configured to perform digital-to-analog and/or analog-to-digital conversions of data 218 such that data 218 is suitable for transmission over wireless link 220.

RF module 214 can be configured to transmit and/or receive data from DAC/ADC block 212. RF module 214 is also configured to perform a frequency conversion of data 218 such that data 218 can be properly communicated over wireless link 220. For example, when data 218 is received at RF module 214, data 218 can have a frequency residing in the baseband (BB) or near BB. Therefore. RF module 214 can up-convert data 218 from BB to RF such that data 218 can then be communicated over wireless link 220. RF module 214 can also be configured to down-convert a signal received over wireless link 220, from RF to BB, or near BB, such that the received signal can be properly communicated to modem assembly 208.

Figure 3:
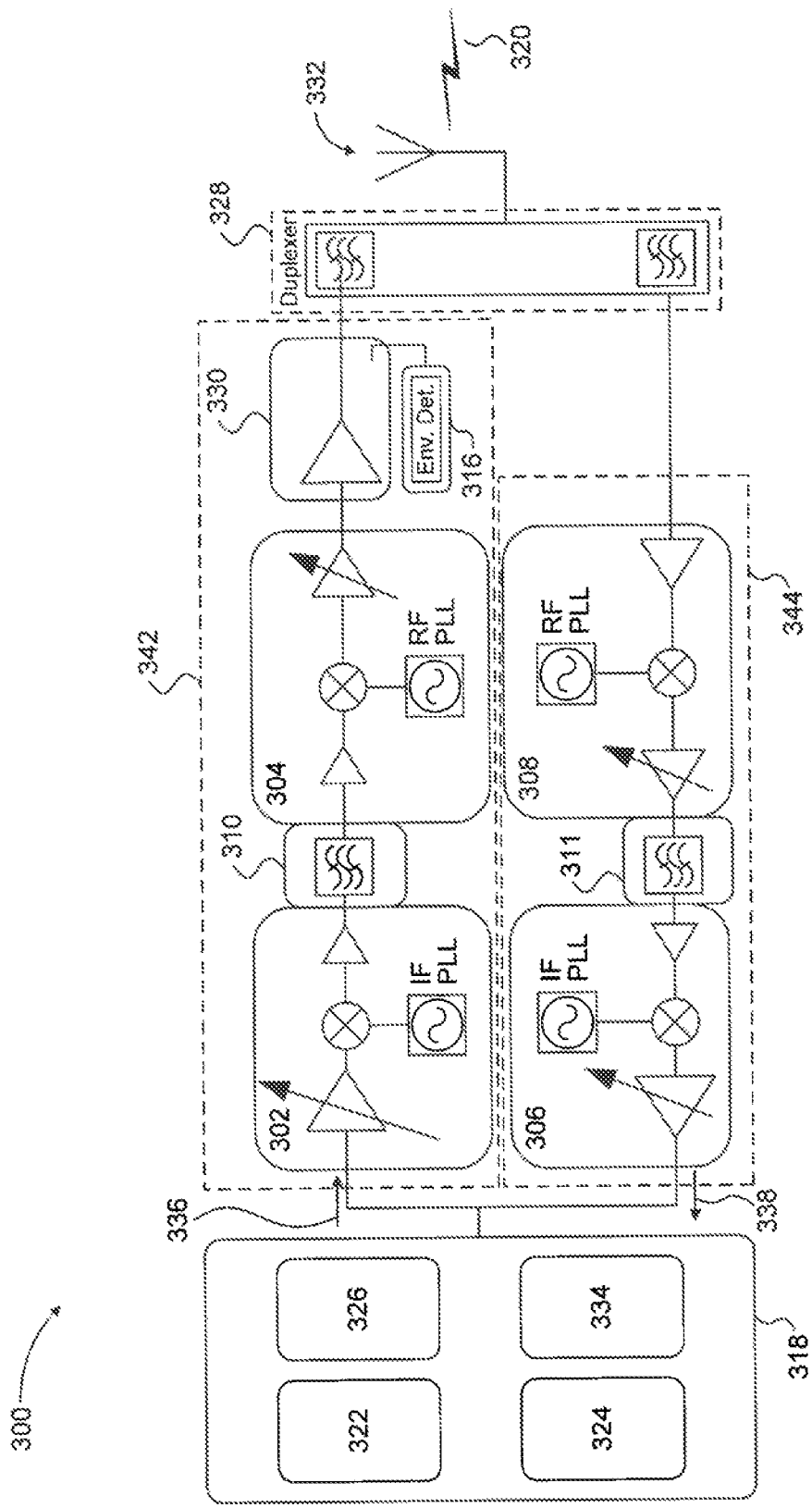
FIG. 3 illustrates a block diagram of a second ODU for implementation within an all ODU microwave backhaul system according to an exemplary embodiment of the present disclosure.

FIG. 3 illustrates a block diagram of a second ODU 300 for use within an all ODU microwave backhaul system according to an exemplary embodiment of the present disclosure. ODU 300 can represent an exemplary embodiment of ODU 122 from FIG. 1B or ODU 202 from FIG. 2. ODU 300 includes multiple frequency converters 302, 304, 306 and 308, a power amplifier 330, an envelope detector 316, a modem assembly 318, and a duplexer 328. In some embodiments, ODU 300 can also include filters 310 and 311. Frequency converters 302 and 304, power amplifier 330, envelope detection 316 and filter 310 may comprise a transmission block 342, and frequency converters 306 and 308, and filter 311 may comprise a receipt block 344.

Modem assembly 318 can be an exemplary embodiment of modem assembly 208 from FIG. 2. Modem assembly 318 may include a pre-distortion block 322, an adaptive digital pre-distortion block 324, a filter 326, and a DAC/ADC block 334. In some embodiments, modem assembly 318 can be implemented as a dual channel modem, such that ODU 300 is capable of transmitting data 336 and receiving data 338 at relatively high rates over a wireless link 320. For example, modem assembly 318 can be configured to drive two separate channels through a single DAC/ADC block 334 and through transmission block 342, such that the two channels can be substantially simultaneously transmitted over wireless link 320. Therefore, data 336 (and data 338) may comprise two communication channels. For example, the two communication channels that comprise data 336 (or data 338) may represent two adjacent channels, two non-adjacent channels, or a dual channel over a single interconnect, to provide some examples.

Pre-distortion block 322 can be configured to improve linearity of ODU 300 (e.g. improve an accuracy with which ODU 300 reproduces data at its input). For example, pre-distortion block 322 can be configured to inversely model a gain and a phase of power amplifier 330 such that, when combined with power amplifier 330, pre-distortion block 322 produces an overall system that is more linear and reduces power amplifier 330's distortion. Additionally, pre-distortion block 322 may be implemented in either an analog or a digital manner.

Adaptive digital pre-distortion block 324 may also be configured to improve the linearity of ODU 300. As mentioned above, transmitting two non-adjacent channels (e.g. the two communication channels that comprise data 336) through a single RF lineup can create difficulties from a linearity perspective. In particular, cross modulation products from both channels may not meet mask and noise floor European Telecommunications Standards Institute (ETSI) standards. Therefore, adaptive digital pre-distortion block 324 can be configured to significantly reduce intermodulation (IMD) products to meet ETSI standards, while also allowing for transmission at relatively high output powers. Further, adaptive digital pre-distortion block 324 can be implemented to work with numerous different power amplifiers.

Adaptive digital pre-distortion block 324 reduces the IMD products from both communication channels (e.g. either the two communication channels that comprise data 336 or the two communication channels that comprise data 338) through the use or an RF feedback path (not shown) such that ODU 300 can adapt to the changes in the response of power amplifier 330, which may be due to varying operating conditions. In some embodiments, adaptive digital pre-distortion block 324 can be configured to implement multiple different adaption algorithms. For example, adaptive digital pre-distortion block 324 may employ a "blind adaptive" algorithm based on distance-gradient methods, or a "polynomial function" algorithm that attempts to directly model the nonlinearities. Correction factors computed using these adaptation algorithm may then be stored in a look-up table (LUT), and may be dynamically updated to reduce errors between adaptive digital pre-distortion block 324's input and power amplifier 330's output. Adaptive digital pre-distortion block 324 can also be configured to improve a performance of ODU 300 in the presence of process aging and voltage/temperature changes. Further, adaptive digital pre-distortion block 324 can increase ODU 300's transmission power by approximately 2 dB to approximately 3 dB.

Filter 326 may be configured to pass low-frequency signals while attenuating (e.g. reducing an amplitude of) signals having frequencies higher than a pre-determined cutoff frequency. Filter 326 may also be configured to reduce differences in power of different components of data 336 or 338. In some embodiments, filter 326 may include one or more filters. For example, filter 326 may include a low-pass filter, a pre-emphasis filter, or the like.

DAC/ADC block 334 can represent an exemplary embodiment of DAC/ADC block 212 from FIG. 2. Thus, DAC/ADC block 334 can be configured to perform digital-to-analog and/or analog-to-digital conversions of data 336 and 338 such that data 336 is suitable for transmission over wireless link 320 and such that data 338 can be properly received over wireless link 320.

Frequency converters 302 and 304 can function substantially as frequency up-converters. In particular, when data 316 is output from modem assembly 318, data 336 can have a frequency in the BB, or near BB. Therefore, frequency converters 302 and 304 can up-convert data 336 from BB, or near 1313, to RF such that it can be transmitted over wireless link 320 via antenna 332.

Frequency converters 306 and 308 can function substantially as frequency down-converters, in particular, when data 338 is received at antenna 332, over wireless link 320, data 338 can have a frequency in the RF range. Therefore, frequency converters 306 and 308 can down-convert data 338 from RF to BB, or near BB, such that it can be processed by modem assembly 318.

In an exemplary embodiment, frequency converters 302-308 may be replaced by a single phase-locked loop (PLL), which may be configured to perform both the necessary up-conversions as well as the necessary down-conversions discussed above.

Additionally, or alternatively, each frequency converter 302-308 can include its own PLL. For example, frequency converters 302 and 306 can each include an IF PLL, and frequency converters 304 and 308 can each include an RF PLL. The PLLs can be implemented as electronic circuits, each consisting of a variable frequency oscillator and a phase detector. These electronic circuits can be configured to compare a phase of an input signal (e.g. data 336 or 338) with a phase of a signal derived from its output oscillator and adjust a frequency of its oscillator to keep these phases matched. A signal, representing a different between the phase of the input signal and the phase of the signal derived from the output oscillator, from the phase detector can also be used to control the oscillator via a feedback loop.

Frequency converters 302 and 304, as well as frequency converters 306 and 308, can have a filter 310 and 311 implemented therebetween, respectively. As discussed above, filters 310 and 311 can be configured to filter data 336 and 338 such that data 336 and 338 can be transmitted and received over wireless link 320, respectively. For example, filters 310 and 311 can be configured to perform any combination of an analog filtering process, a signal sampling process and/or a digital filtering process.

Power amplifier 330 can be configured to amplify data 336, after data 336 has been up-converted by frequency converters 302 and 304. In particular, power amplifier 330 is configured to amplify data 336 such that it is capable of being transmitted over wireless link 320 via antenna 332. Power amplifier 330 can be coupled to envelope detector 316, which can be configured to reduce ODU 300's power consumption. For example, envelope detector 316 can be configured to receive a high-frequency input and provide an output that represents the envelope of the original input.

Duplexer 328 is configured to permit bi-directional communication over wireless link 320. In particular, transmitting two non-adjacent channels through a single DAC/ADC in a conventional all ODU configuration can create problems such as LO leakage, image problems, or the like. Consequently, these interferes may not meet mask and noise floor limitations, and may also limit transmission power of the conventional ODU. Therefore, in addition to the algorithms implemented by pre-distortion block 322 and adaptive digital pre-distortion block 324, duplexer 328 is configured to optimize the frequency separation between the two communication channels that comprise data 336 and 338. For example, duplexer 328 can perform several different filtering techniques to ensure adequate frequency separation between the two communication channels. Therefore, duplexer 328 is configured to solve the LO leakage and image problems such that data 336 and 338, each having two communication channels, can be properly transmitted and received over wireless link 320, respectively.

In some embodiments, duplexer 328 may be configured to isolate frequency converters 302 and 304 from frequency converters 306 and 308, while permitting them to share a common antenna 332.

As discussed above, modem assembly 318 may be implemented as a dual channel modem. Thus, modem assembly 318 can facilitate relatively high capacity communication over wireless link 320. In particular, modem assembly 208 may allow wireless link 320 to have a link capacity that is approximately double the capacity of a wireless link associated with a conventional all ODU configuration. For example, modem assembly 318 can be configured to drive the two communication channels through a single DAC/ADC 334, such that the two communication channels are flexibly configured (for numerous different configuration in a wide range) to be transmitted and received over wireless link 320.

During transmission of the two communication channels that comprise data 336, ODU 300 can employ several different methods to transmit the two communication channels while only using the single DAC/ADC 334. For example, ODU 300 can employ a low IF transmission option, a non-symmetric transmission option (e.g. where the two communication channels are not transmitted at the same data rate), a symmetric transmission (e.g. where the two communication channels are transmitted at the same data rate), or the like. ODU 300 can employ any combination of the aforementioned processes to determine which transmission option is optimal to overcome problems, such as LO leakage, image problems, intermodulation between the communication channels, continuous wave (CW) interference, and noise floors, and to meet ETSI standards. These correction processes allow interferers to be removed up to the order of 80 dBc to meet the ETSI standard. Similar problems arise during receipt of the two communication channels that comprise data 338, which tend to limit conventional ODU's from being able to handle the receipt of two communication channels. Most of these limitations are generated by ETSI standardizations tests and adjacent/co-channel interferers tests. However, the aforementioned correction processes coupled with ODU 300's RF to BB frequency conversion architecture, allows ODU 300 to overcome these problems and meet the necessary standards.

Figure 4A:
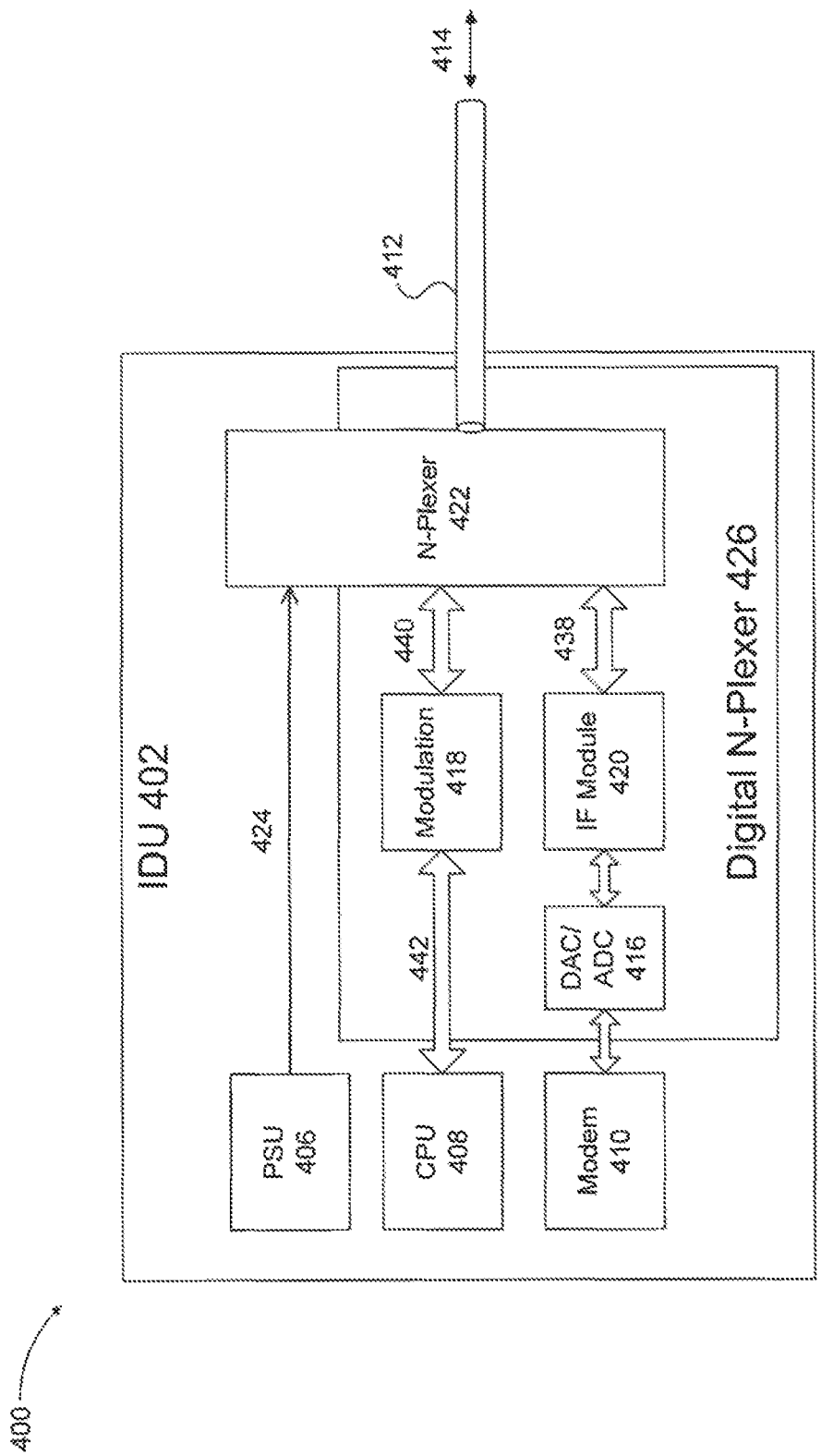
FIG. 4A illustrates a block diagram of an indoor communication unit (IDU) for implementation within a split ODU microwave backhaul system according to an exemplary embodiment of the present disclosure.
Figure 4B:
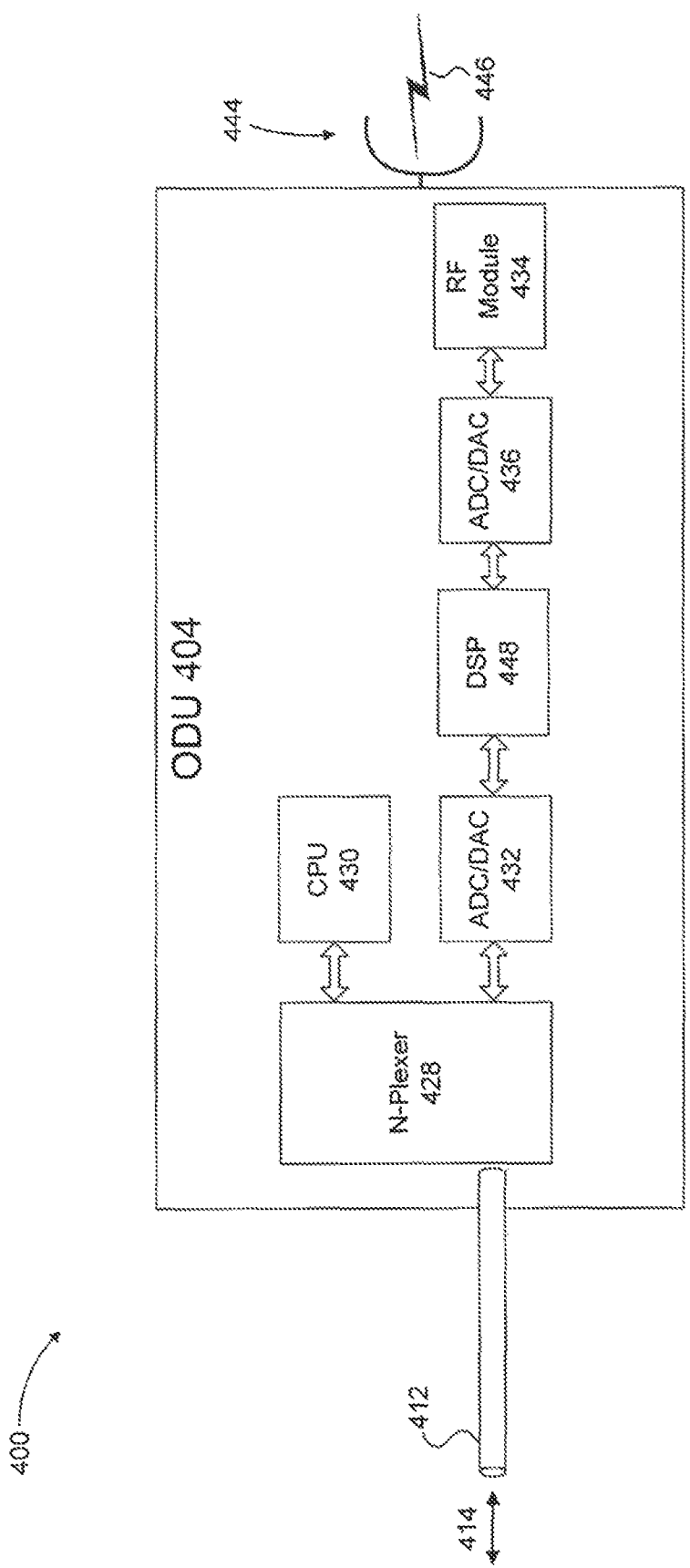
FIG. 4B illustrates a block diagram of a first ODU for implementation within a split ODU microwave backhaul system according to an exemplary embodiment of the present disclosure.

An Exemplary IDU and ODU for Implementation within a Split ODU Microwave Backhaul System FIGS. 4A and 4B illustrate block diagrams of an indoor communication unit (IDU) 402 and a first outdoor communication unit (ODU) 404, respectively, for use within a split ODU microwave backhaul system 400 according to an exemplary embodiment of the present disclosure. IDU 402 and ODU 404 are coupled together via a communication pathway 412. IDU 402 can represent an exemplary embodiment of IDU 102 of FIG. 1A, and ODU 404 can represent an exemplary embodiment of ODU 104 of FIG. 1A.

IDU 402 includes a power supply unit (PSU) 406, a CPU 408, a modem assembly 410, a digital-to-analog converter/analog-to-digital converter (DAC/ADC) block 416, a modulation block 418, and an intermediate frequency (IF) module 420. In some embodiments. IDU 402 can also include an N-Plexer 422.

As illustrated in FIG. 4A, PSU 406 is configured to produce a DC output voltage 424. CPU 408 is configured to carry out instructions to perform arithmetical, logical, and/or input/output (I/O) operations of one or more of the aforementioned elements contained within IDU 402. In an embodiment, CPU 408 can control operation of modulation block 418 and N-Plexer 422.

Modem assembly 410 is configured to perform modulation and demodulation of data 414 that is to be transmitted between IDU 402 and ODU 404. In some embodiments, modem assembly 210 can function substantially similar to a baseband modem. Further, modem assembly 410 can be configured to cancel out noise associated with IDU 402 or communication pathway 412.

In some embodiments, modem assembly 410 can also be implemented as a dual channel modem. For example, modem assembly 410 can be configured to drive two communication channels over communication pathway 412 and to ODU 404.

Accordingly, when modem assembly 410 is operating as a dual channel modem, data 414 may comprise two communication channels.

Therefore, communication pathway 412 can be a dual channel communication pathway, which can effectively double the capacity of split ODU microwave backhaul system 400. In some embodiments, the dual channel communication pathway 412 can include a transmit pathway and a receive pathway, such that a portion of the bandwidth of dual channel communication pathway 412 is allocated to the transmit pathway to facilitate communication from IDU 402 to ODU 404, and a remaining portion of the bandwidth is allocated to the receive pathway to facilitate communication from the ODU 404 to the IDU 402. Additionally, dual channel communication pathway 412 can include two bi-directional pathways. For example, dual channel communication pathway 412 can include two bi-directional pathways that each facilitate communication between the same two IDUs and the same single ODU. Thus, in an embodiment, each bi-directional pathway can handle a portion of the overall bandwidth between the two IDUs and the single ODU, thereby effectively doubling the capacity of split ODU microwave backhaul system 400.

Additionally, dual channel communication pathway 412 can include two adjacent channels, two non-adjacent channels, or a dual channel over a single cable, to provide some examples. In some embodiments, dual channel communication pathway 412 can comprise two non-adjacent channels that are flexibly configured to support numerous different backhaul configurations over a wide range of operating parameters.

In some embodiments, modem assembly 410 may also support channel bonding by combining two or more network interfaces to increase throughput. Modem assembly 410 can also be configured to support single chip cross polarization interference cancellation (XPIC) to increase the capacity of split ODU microwave backhaul system 400. Additionally, or alternatively, modem assembly 410 can be configured to support other double capacity configurations such as multiple-input and multiple-output (MIMO) spatial multiplexing and radio optimized network planning, to provide some examples. Further, modem assembly 410 can be configured to cancel out noise that may be associated with ODU 402 or communication pathway 412.

DAC/ADC block 416 can be configured to transmit and/or receive data from modem assembly 410. DAC/ADC block 416 is also configured to perform digital-to-analog and/or analog-to-digital conversions of data 414 such that data 414 is suitable for transmission over communication pathway 412.

Modulation block 418 can be configured to transmit and/or receive a signal 442 from CPU 408. Modulation block 418 can also be configured to perform various modulation and/or demodulation techniques. In an embodiment, modulation block 418 can be configured to perform amplitude-shift keying. For example, modulation block 418 can be configured to perform amplitude-shift keying by utilizing a finite number of amplitudes, where each amplitude is assigned a unique pattern of binary digits. Each pattern can then be configured to form the specific symbol that is represented by the particular amplitude. Additionally, when modulation block 418 is configured to perform demodulation, modulation block 418 determines the amplitude of the received signal and maps it back to the symbol it represents, thus recovering the original data.

IF module 420 can be configured to transmit and/or receive data from DAC/ADC block 416. IF module 420 is also configured to perform a frequency conversion of the received data such that data 414 is suitable for transmission over communication pathway 412. For example, IF module 420 can be configured to convert data 414 from BB, or near BB, to IF.

N-Plexer 422 can be configured to permit N-directional communication over communication pathway 412. In particular, N-Plexer 422 is configured to isolate DU 402 from ODU 404, while permitting them to share a common antenna. N-Plexer 422 is also configured to receive DC output voltage 424 from PSU 406, to receive a control signal 440 (e.g. a Telemetry ASK signal) output from modulation block 418, and to receive an IF signal 438 output from IF module 420. Additionally, N-Plexer 422 can be configured to convert and/or combine each of these inputs to form data 414. N-Plexer 422 is also configured to transmit and/or receive data 414, over communication pathway 412, between IDU 402 and ODU 404. In an embodiment. N-Plexer 422 can function substantially as an analog duplexer (multiplexer/demultiplexer).

In some embodiments, communication pathway 412 can include one or more links (e.g. pathways). Communication pathway 412 can be configured to permit transmission of approximately four different signals between IDU 402 and ODU 404; however, transmissions of more or less signals are possible between IDU 402 and ODU 404. For example, communication pathway 412 can be configured to transmit a transmission communication signal (TX), a receipt communication signal (RX), an up control signal, and a down control signal. Additionally, or alternatively, communication pathway 412 can be configured to allow TX, RX, a Telemetry ASK signal (output from modulation block 218) and DC output voltage 424 to coexist on communication pathway 412. In an embodiment, communication pathway 412 can represent an IF cable, and thus the conversion to the analog domain of these signals can be performed at IDU 402 (e.g. by DAC/ADC block 416).

In an exemplary embodiment. DAC/ADC block 416, modulation block 418, IF module 420 and N-Plexer 422 can be replaced by Digital N-Plexer 426. In particular, Digital N-Plexer 426 can be configured to multiplex/demultiplex the required signal in the digital domain, rather than in the analog domain. Subsequently, Digital N-Plexer 426 can allow communication pathway 412 to be implemented as either a digital pathway or an analog pathway. Using Digital N-Plexer 426 allows for a simpler implementation of IDU 402. For example, when implementing IDU 402 having Digital N-Plexer 426, no analog functionality would be required, and instead only a single digital chip substrate would be needed. As a result, the cost of implementing IDU 402 can be decreased. Additionally, using a Digital N-Plexer 426 can provide an improved yield, shorter production testing, lower assembly cost, lower peripheral component count, and can support greater distances between IDU 402 and ODU 404, to provide some examples.

As illustrated in FIG. 4B, ODU 404 can also include an N-Plexer 428, which can be implemented in several different manners. For example, N-Plexer 428 can be an analog N-Plexer, a digital N-Plexer, or a split function N-Plexer (e.g., where N-Plexer 428 is partially analog and partially digital). When N-Plexer 428 represents a digital N-Plexer, N-Plexer 428 can function in a substantially similar manner as Digital N-Plexer 426. In particular, N-Plexer 428 can be configured to multiplex/demultiplex signals in the digital domain. N-Plexer 428 also allows for a simpler implementation of ODU 404 because no analog functionality would be required, and instead only a single digital chip substrate would need to be implemented within ODU 404. Therefore, the cost of implementing ODU 404 can also be decreased. Similar to Digital N-Plexer 426, implementing N-Plexer 428 within ODU 404 can provide an improved yield, shorter production testing, lower assembly cost, lower peripheral component count, and can support greater distances between IDU 402 and ODU 404, to provide some examples.

ODU 404 can also include a CPU 430, ADC/DAC blocks 432 and 436, a digital signal processor (DSP) 448, and an RF module 434. CPU 430 can be configured to function in a substantially similar manner as CPU 208. In particular, CPU 430 is configured to carry out instructions to perform arithmetical, logical, and/or I/O operations of one or more of the elements contained within ODU 404. In an embodiment, CPU 430 can control operation of N-Plexer 428.

ADC/DAC block 432 can be configured to transmit and/or receive data from N-Plexer 428. ADC/DAC blocks 432 and 436 are also configured to perform analog-to-digital and/or digital-to-analog conversions of data 414 such that data 414 can be properly transmitted and/or received over wireless link 446.

DSP 448 can be configured to preform mathematical manipulation techniques on data 414, such that data 414 may be modified or improved according to a desired processing method. For example, DSP 448 can be configured to measure, filter, or compress data 414 prior to being output to ADC/DAC block 436, such that error detection and/or error correction can be performed on data 414. In an embodiment, after data 414 is received, over communication pathway 412, at ODU 404, data 414 traverses through N-Plexer 428, to ADC/DAC block 432, to DSP 448, to ADC/DAC block 436, to RF module 434 and to an antenna 444 before being transmitted across wireless link 446. Similarly, after data 414 is received, over wireless link 446, at ODU 404, data 414 traverses from antenna 444 to RF module 434, to ADC/DAC block 436, to DSP 448, to ADC/DAC block 432, and to N-Plexer 428 before being transmitted over communication pathway 412.

RF module 434 can be configured to transmit and/or receive data from ADC/DAC block 436. RF module 434 is also configured to perform a frequency conversion of data 414 such that data 414 can be properly communicated over wireless link 446. For example, when data 414 is received at RF module 234, data 414 can have a frequency residing in the IF range. Therefore, RF module 434 can up-convert data 414 from IF to RF such that data 414 can then be communicated over wireless link 446. RF module 434 can also be configured to down-convert a signal received over wireless link 446 from RF to IF such that the received signal can be transmitted over communication pathway 412 to IDU 402.

As discussed above, modem assembly 410 can be a dual channel modem, and can drive two communication channels (e.g. two communication channels comprising data 414) over communication pathway 412 and to ODU 404. Accordingly, ODU 404 may be configured to facilitate transmission of the two communication channels over wireless link 446 at a relatively high capacity. In particular, after ODU 404 receives data 414, over communication pathway 412, ODU 404 can transmit data 414 over wireless link 446 such that wireless link 446 has a link capacity that is approximately double the capacity of a wireless link associated with a conventional split ODU configuration. Therefore, wireless link 446 may be a dual channel wireless link. In some embodiments, each of the two communication channels comprising data 414 may support an approximately 112 MHz wide channel, which is double the capacity for conventional microwave links.

Figure 5:
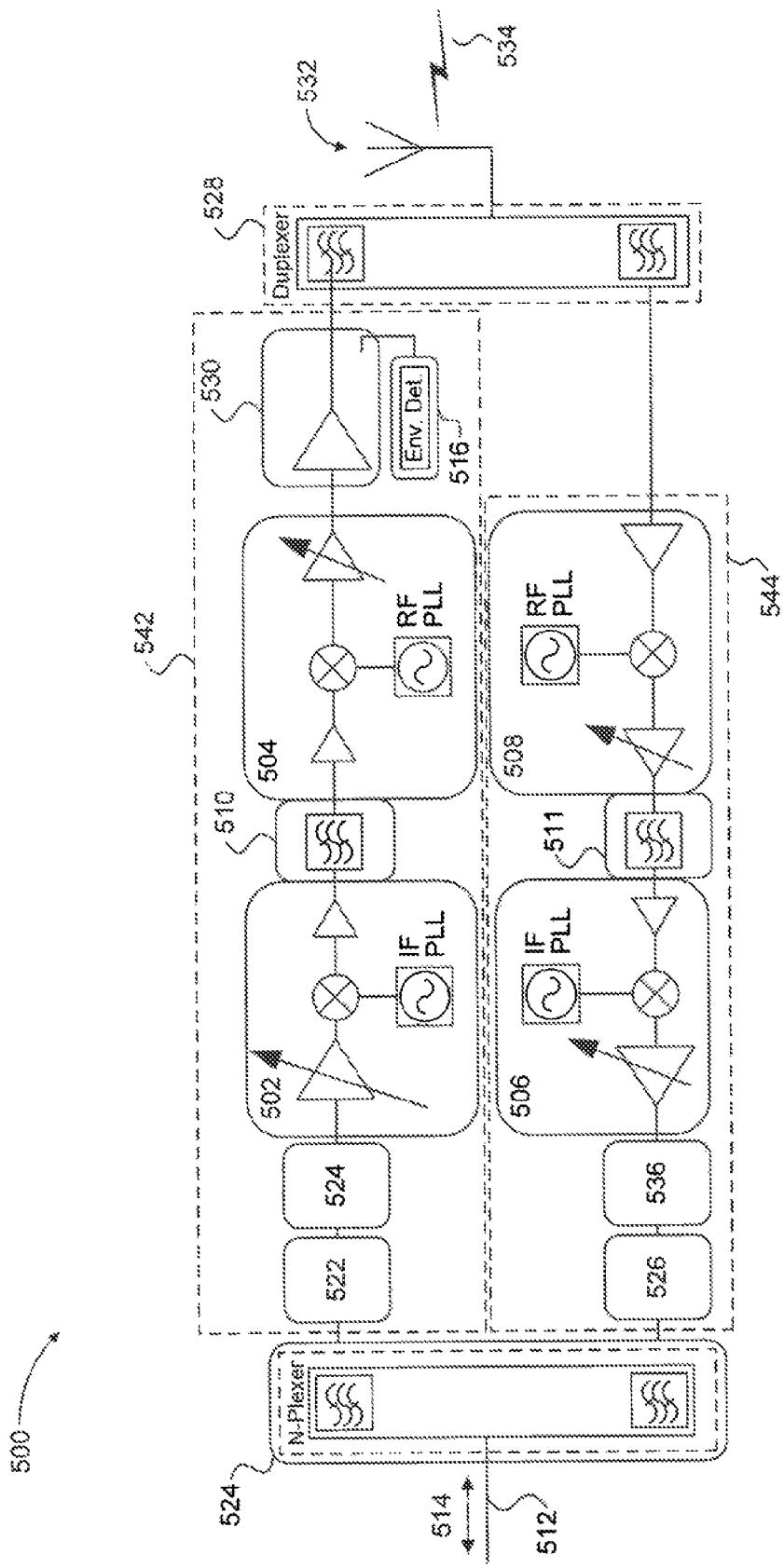
FIG. 5 illustrates a block diagram of a second ODU for implementation within a split ODU microwave backhaul system according to an exemplary embodiment of the present disclosure.

FIG. 5 illustrates a block diagram of a second ODU 500 for use within a split ODU microwave backhaul system according to an exemplary embodiment of the present disclosure. ODU 500 can represent an exemplary embodiment of ODU 104 from FIG. 1A or ODU 404 from FIG. 4B. ODU 500 includes multiple frequency converters 502, 504, 506 and 508, a power amplifier 530, an envelope detector 516, an N-Plexer 524, and a duplexer 528. In some embodiments, ODU 500 can also include filters 510 and 511. Frequency converters 502 and 504, power amplifier 530, envelope detection 516 and filter 510 may comprise a transmission block 542, and frequency converters 506 and 508, and filter 511 may comprise a receipt block 544.

In some embodiments, N-Plexer 524 can function substantially similar to N-Plexer 428 from FIG. 4B. In particular, N-Plexer 524 can be configured to multiplex/demultiplex the required signal in the digital domain. N-Plexer 524 can also be configured to permit N-directional communication over communication pathway 512. As discussed above, N-Plexer 524 is configured to isolate IDU 402 from ODU 504, while permitting them to share a common antenna 532. Similarly, N-Plexer 524 can be configured to perform various processes on data 514 such that the two communication channels comprising data 514 can be communicated at relatively high rates over a wireless link 534. For example, N-Plexer 524 can be configured to allow the two communication channels to be driven through transmission block 542 such that the two communication channels can be transmitted over wireless link 534.

As discussed above, in contrast to an all ODU microwave backhaul system, a split ODU microwave backhaul system is implemented such that the modem assembly is unloaded from the ODU to the IDU. However, even though the modem assembly has been offloaded from ODU 500 (shown as modem assembly 410 in FIG. 4A), some of the functionality performed by modem assembly has been incorporated into ODU 500. Therefore, in some embodiments, transmission block 542 and receipt block 544 may be further configured to perform a pre-distortion process on data 514 such that the two communication channels comprising data 514 can be communicated at relatively high rates over a wireless link 534. Accordingly, transmission block 542 may also include a pre-distortion block 522 and an adaptive digital pre-distortion block 524, and receipt block 544 may similarly include a pre-distortion block 526 and an adaptive digital pre-distortion block 536.

Pre-distortion blocks 522 and 526 can be configured to improve a linearity of ODU 500 (e.g. improve an accuracy with which ODU 500 reproduces data at its input). For example, pre-distortion blocks 522 and 526 can be configured to inversely model a gain and a phase of power amplifier 530 such that, when combined with power amplifier 530, pre-distortion blocks 522 and 526 produce an overall system that is more linear and reduce power amplifier 530's distortion. Pre-distortion blocks 522 and 526 may be implemented in either an analog or a digital manner.

Adaptive digital pre-distortion blocks 524 and 536 may also be configured to improve the linearity of ODU 500. As mentioned above, transmitting two non-adjacent channels (e.g. the two communication channels that comprise data 514) through a single RF lineup can create difficulties from a linearity perspective. In particular, cross modulation products from both channels may not meet mask and noise floor European Telecommunications Standards Institute (ETSI) standards. Therefore, adaptive digital pre-distortion blocks 524 and 526 can be configured to significantly reduce intermodulation (IMO) products to meet ETSI standards, while also allowing for transmission at relatively high output powers. In some embodiments, adaptive digital pre-distortion blocks 524 and 526 can be implemented to work with numerous different power amplifiers.

Adaptive digital pre-distortion blocks 524 and 526 reduce the IMD products from both communication channels through the use or an RF feedback path (not shown) such that ODU 500 can adapt to the changes in the response of power amplifier 530, which may be due to varying operating conditions, in some embodiments, adaptive digital pre-distortion blocks 524 and 526 can be configured to implemented multiple different adaption algorithms. For example, adaptive digital pre-distortion blocks 524 and 526 may employ a "blind adaptive" algorithm based on distance-gradient methods, or a "polynomial function" algorithm that attempts to directly model the nonlinearities. Correction factors computed using these adaptation algorithm may then be stored in a look-up table (LUT), and may be dynamically updated to reduce errors between adaptive digital pre-distortion block 524's input and power amplifier 530's output, as well as between adaptive digital pre-distortion block 526's input and power amplifier 530's output. Adaptive digital pre-distortion blocks 524 and 526 can also be configured to improve a performance of ODU 500 in the presence of process aging and voltage/temperature changes. Further, adaptive digital pre-distortion blocks 524 and 526 can increase ODU 500's transmission power by approximately 2 dB to approximately 3 dB.

Frequency converters 502 and 504 can function substantially as frequency up-converters. In particular, when data 514 is received over communication pathway 512, the data can have a frequency in the IF range. Therefore, frequency converters 502 and 504 can up-convert data 514 from IF to RF such that it can be transmitted over wireless link 534 via antenna 532.

Frequency converters 506 and 508 can function substantially as frequency down-converters, in particular, when a signal is received at antenna 532, over wireless link 534, data 514 can have a frequency in the RE range. Therefore, frequency converters 506 and 508 can down-convert the received signal from RE to IF such that it can be transmitted over communication pathway 512.

Each frequency converter 502-508 can include a PLL. For example, frequency converters 502 and 506 can each include an IF PLL, and frequency converters 504 and 508 can each include an RE PLL. The PLLs can be implemented as electronic circuits, each consisting of a variable frequency oscillator and a phase detector. These electronic circuits can be configured to compare a phase of an input signal (e.g. data 514 or the received signal from antenna 532) with a phase of a signal derived from its output oscillator and adjust a frequency of its oscillator to keep these phases matched. A signal, representing a different between the phase of the input signal and the phase of the signal derived from the output oscillator, from the phase detector can also be used to control the oscillator via a feedback loop.

Frequency converters 502 and 504, as well as frequency converters 506 and 508, can have a filter 510 and 511 implemented therebetween, respectively. As discussed above, filters 510 and 511 can be configured to filter data 514 such that data 514 can be transmitted and received over wireless link 534. For example, filters 510 and 511 can be configured to perform any combination of an analog filtering process, a signal sampling process and/or a digital filtering process.

In some embodiments, filters 510 and 511 may be configured to pass low-frequency signals while attenuating (e.g. reducing an amplitude of) signals having frequencies higher than a pre-determined cutoff frequency. Filters 510 and 511 may also be configured to reduce differences in power of different components of data 514. In some embodiments, filters 510 and 511 may each include one or more filters. For example, filters 510 and 511 may each include a low-pass filter, a pre-emphasis filter, or the like.

Power amplifier 530 can be configured to amplify data 514, after data 514 has been up-converted by frequency converters 502 and 504. In particular, power amplifier 530 is configured to amplify data 514 such that it is capable of being transmitted over wireless link 534 via antenna 532. Power amplifier 530 can be coupled to envelope detector 516, which can be configured to reduce ODU 500's power consumption. For example, envelope detector 516 can be configured to receive a high-frequency input and provide an output that represents the envelope of the original input.

Duplexer 528 is configured to permit bi-directional communication over wireless link 534. For example, in addition to the algorithms implemented by pre-distortion blocks 522 and 526 and adaptive digital pre-distortion blocks 524 and 536, duplexer 528 is configured to optimize the frequency separation between the two communication channels. For example, duplexer 528 can perform several different filtering techniques to ensure adequate frequency separation between the two communication channels that comprise data 514. Therefore, duplexer 528 is configured to solve the LO leakage and image problems such that data 514 can be properly transmitted and received over wireless link 534. Additionally, duplexer 528 may be configured to isolate frequency converters 502 and 504 from frequency converters 506 and 508, while permitting them to share a common antenna 532.

As discussed above, ODU 500 can facilitate relatively high capacity communication over wireless link 534. In particular, ODU 500 may allow wireless link 534 to have a link capacity that is approximately double the capacity of a wireless link associated with a conventional all ODU configuration. For example, wireless link 534 may be implemented as a dual channel wireless link.

During transmission of the two communication channels that comprise data 514, ODU 500 can employ several different methods to transmit the two communication channels. For example, ODU 500 can employ a low IT transmission option, a non-symmetric transmission option, a symmetric transmission, or the like. ODU 500 can employ any combination of the aforementioned processes to determine which transmission option is optimal to overcome problems, such as LO leakage, image problems, intermodulation between the communication channels, continuous wave (CW) interference, and noise floors, and to meet ETSI standards. These correction processes allow interferers to be removed up to the order of 80 dBc to meet the ETSI standard.

Similar problems arise during receipt of the two communication channels that comprise data 514, which tend to limit conventional ODU's from being able to handle the receipt of two communication channels. Most of these limitations are generated by ETSI standardizations tests and adjacent/co-channel interferers tests. However, the aforementioned correction processes allow ODU 500 to overcome these problems and meet the necessary standards.

Frequency converters 502-508, filters 510 and 511, power amplifier 530, envelope detector 516, pre-distortion blocks 522 and 526, and adaptive digital pre-distortion blocks 524 and 536 can be implemented on a single digital chip substrate (e.g. an integrated circuit), duplexer 528 and at least a portion of N-Plexer 524 may be implemented on mother chip substrate. When ODU 500 is implemented having each of these elements on a single digital chip substrate, ODU 500 has substantial digital capabilities, thus allowing ODU 500 to perform the digital processing techniques discussed above.

Frequency converters 502-508, power amplifier 530, filters 510 and 511, envelope detector 516, N-Plexer 524, pre-distortion blocks 522 and 526, adaptive digital pre-distortion blocks 524 and 536, and diplexer 328 are provided for illustrative purposes only, and is not meant to limit the disclosure in any way. Those skilled in the relevant art(s) will recognize that different combinations and/or orientations of these elements, as well as additional elements, are possible without departing from the spirit and scope of the present disclosure.

An Exemplary Dual Channel Wireless Link

Figure 6:
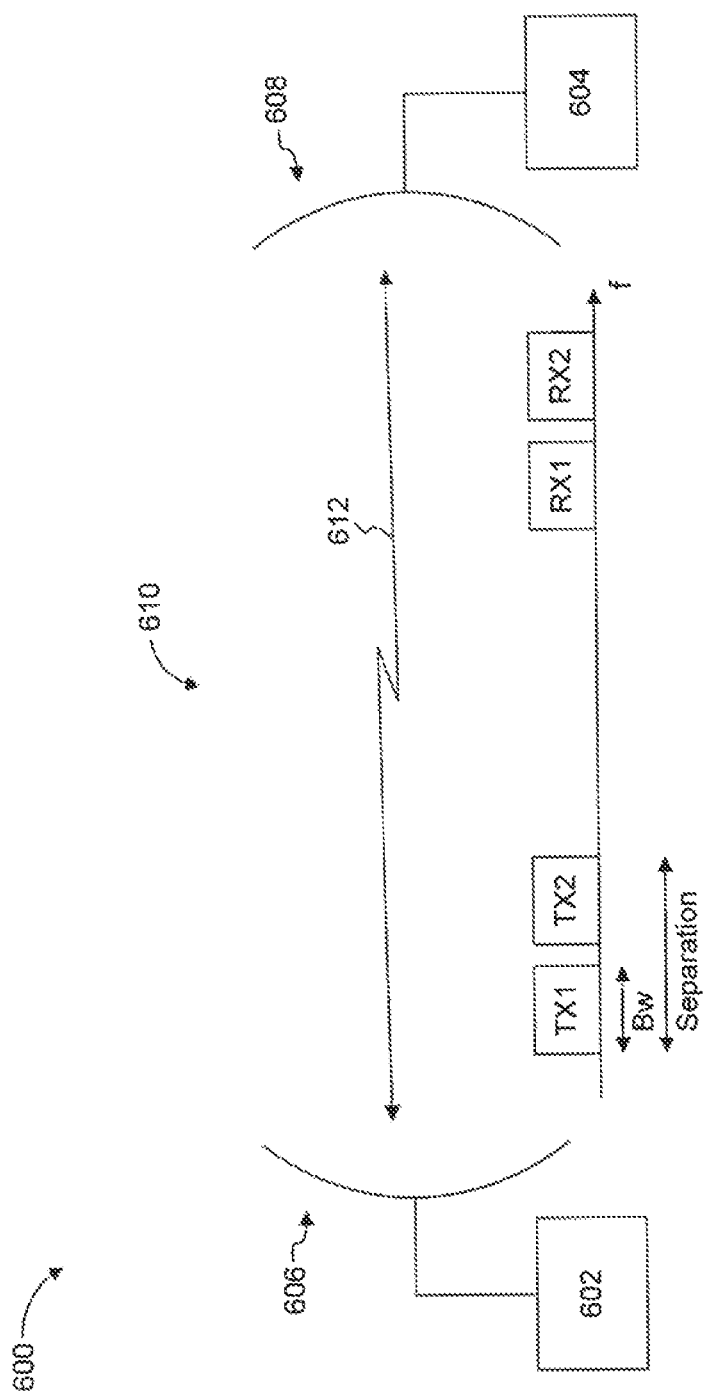
FIG. 6 illustrates a block diagram of a dual channel wireless link being supported by multiple microwave backhaul systems according to an exemplary embodiment of the present disclosure.

FIG. 6 illustrates a block diagram of a microwave backhaul system 600 that includes first and second ODUs 602 and 604, first and second antennas 606 and 608, and a dual channel wireless link 610 according to an exemplary embodiment of the present disclosure. ODUs 602 and 604 can each represent an exemplary embodiment of any of the aforementioned ODUs (e.g. ODUs 104, ODU 122, ODU 202, ODU 300, ODU 404, or ODU 500). Although microwave backhaul system 600 is depicted without IDUs (e.g. an all ODU microwave backhaul system), microwave backhaul system 600 can also be a split ODU microwave backhaul system without departing from the spirit and scope of the present disclosure.

As discussed above, a modem assembly may be implemented within both ODU 602 and ODU 604. Additionally, the modem assemblies may each be dual channel baseband modems such that the modem assemblies can facilitate relatively high capacity communication over dual channel wireless link 610. In particular, the modem assemblies may allow dual channel wireless link 610 to have a link capacity that is approximately double the capacity of a wireless link associated with conventional all ODU (or split ODU) configurations. For example, when the modem assemblies are operating as dual channel modems, data 612 may comprise two communication channels. Accordingly, dual channel wireless link 610 can include two adjacent channels or two non-adjacent channels, to provide some examples. In some embodiments, each of the two communication channels may support an approximately 112 MHz wide channel, which is double the capacity for conventional microwave links.

Therefore, using the principles outlined above, a single radio hardware (e.g. ODU 602 or ODU 604) may be configured to transmit two channels over the same air interface (e.g. dual channel wireless link 610). As shown in FIG. 6, during transmission of data 612 from either ODU 602 or ODU 604, the two channels may be represented as TX1 and TX2, and during receipt of data 612 from either ODU 602 or ODU 604, the two channels may be represented as RX1 and RX2. Additionally, the two channels, which comprise dual channel wireless link 610, do not need to be adjacent to one another in the standard duplexer frequency range. In particular, the two channels can be transmitted and/or received at any frequency within the standard duplexer frequency range. In some embodiments, communication of the two channels over dual channel wireless link 610 may be facilitated by ensuring that the two channels (TX1 and TX2, or RX1 and RX2) have sufficient frequency separation (shown as "separation" in FIG. 6). For example, sufficient frequency separation may be achieved by performing frequency division duplex (FDD)-based communication; however, other frequency separation schemes are also possible.

In an embodiment, ODU 602 may be configured to process data 612 to produce two separate communication channels TX1 and TX2. ODU 602 may then transmit TX1 and TX2 to antenna 606, which may then transmit TX1 and TX2 over dual channel wireless link 610. TX1 and TX2 may be transmitted such that the two channels have a predetermined bandwidth (BW) and frequency separation (separation) to ensure that data 612 will be properly transmitted over dual channel wireless link 610 (e.g. without incurring any significant interference or distortion). TX1 and TX2 may be transmitted over dual channel wireless link 610 according to numerous different transmission schemes, such as cross polarization, to provide an example. Data 612 may then be received at antenna 608 as channels RX1 and RX2. Upon receipt, antenna 608 may then transmit RX1 and RX2 to ODU 604, such that ODU 604 may combine and process RX1 and RX2 to recreate the original data.

Additionally, or alternatively, the modem assemblies includes within ODUs 602 and 604 can be configured to increase the capacity of wireless link 610 by implementing one of several different double capacity configurations, without departing from the spirit and scope of the present disclosure. For example, the modem assemblies may support single chip full cross polarization interference cancellation (XPIC), multiple-input and multiple-output (MIMO) spatial multiplexing and radio optimized network planning.

Figure 7:
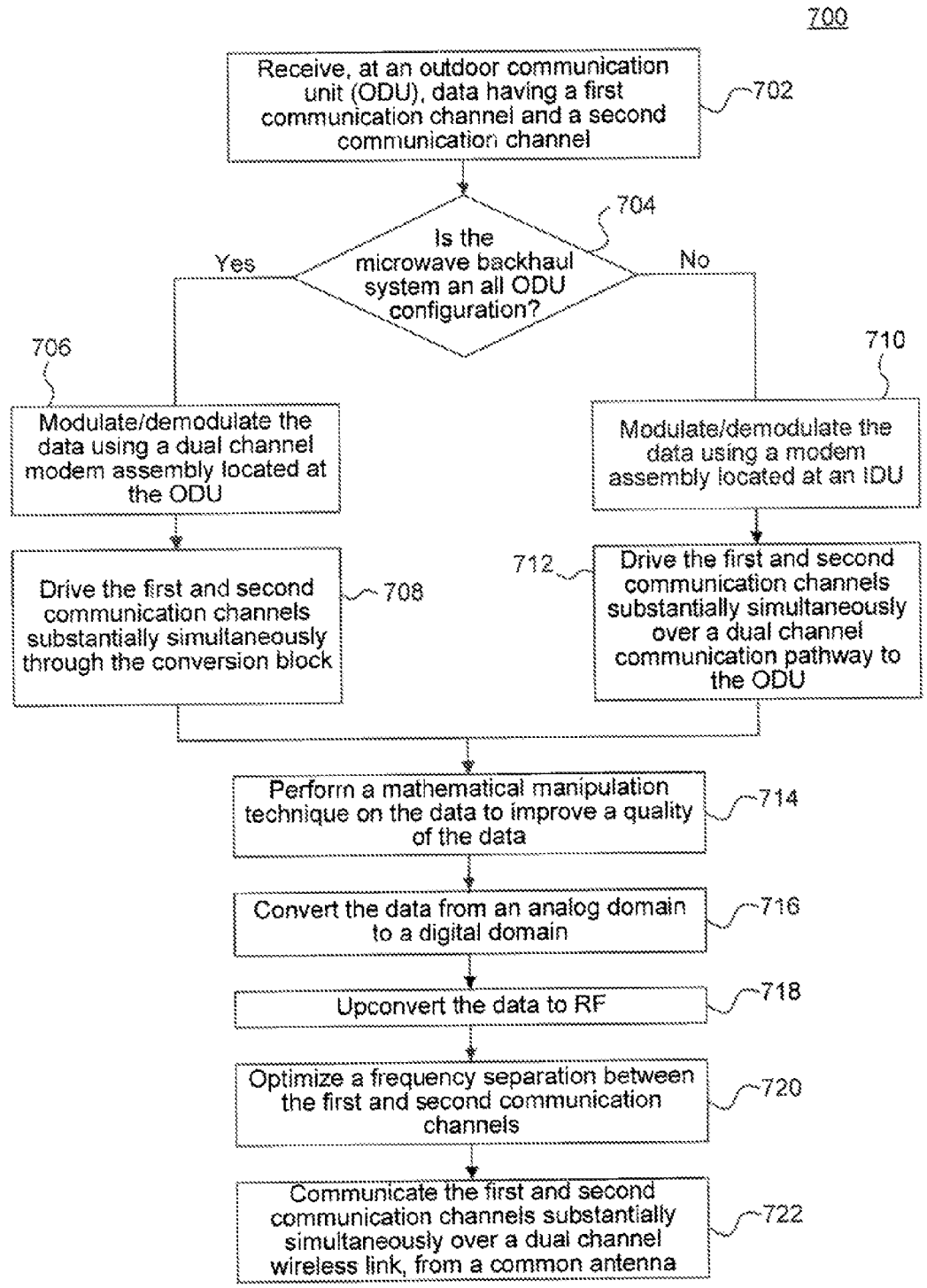
FIG. 7 is a flowchart of exemplary operational steps of communication two channels through a single ODU and over a dual channel wireless link according to an exemplary embodiment of the present disclosure.

An Exemplary Method of Correcting Errors within a Dual Channel Microwave Backhaul System FIG. 7 is a flowchart of exemplary operational steps for communicating two communication channels over a dual channel wireless link according to an exemplary embodiment of the present disclosure. The flowchart of FIG. 7 is described with reference to embodiments of FIGS. 1-5. However, a method 700 is not limited to these embodiments.

Method 700 begins at step 702 where data, such as data 514 to provide an example, is received at an ODU, such as ODU 500 to provide an example, over a dual channel communication pathway, such as the dual channel communication pathway 512 to provide an example. The dual channel communication pathway can represent two adjacent channels, two non-adjacent channels or a dual channel over a single cable, to provide some examples. The data can be received at ODU 500 from an IDU, such as IDU 402 to provide an example, or the data can be received directly from a core network (e.g. an all ODU configuration). Additionally, the data can comprise two communication channels.

In step 704, a decision is made as to whether the microwave backhaul system is an all ODU microwave backhaul system or a split ODU microwave backhaul system. If the system is an all ODU microwave backhaul system, then the method proceeds to step 706. However, if the system is a split microwave backhaul system, then the method proceeds to step 710.

In step 706, the data is modulated/demodulated using a dual channel modem assembly located within the ODU included in the all ODU microwave backhaul system, such ODU 300 to provide an example.

In step 708, the dual channel modem assembly drives the two communication channels that comprise the data through a DAC/ADC, such as DAC/ADC block 334 to provide an example.

Alternatively, in step 710, the data is modulated/demodulated using a modem assembly located within the IDU included in the split ODU microwave backhaul system, and in step 712, modem assembly drives the two communication channels that comprise the data through dual channel communication pathway 512 to ODU 500.

In step 714, one or more processors perform mathematical manipulation techniques on the data to improve a quality (e.g. linearity) of the data. In some embodiments, the one or more processors may include any one, or combination of, pre-distortion block 322, adaptive digital pre-distortion block 324 and filter 326, to provide some examples. In particular, the one or more processors may be configured to ensure that cross modulation products from the two communication channels meet mask and noise floor ETSI standards. The one or more processors may also be configured to significantly reduce intermodulation (IMD) products to meet ETSI standards, while also allowing for transmission, at relatively high output powers In step 716, DAC/ADC block 334 performs digital-to-analog and/or analog-to-digital conversions of the data.

In step 718, frequency converters, such as frequency converters 502 and 504 to provide some examples, upconvert the data from either BB or IF to RF.

In step 720, a duplexer, such as duplexer 528 to provide an example, optimizes a frequency separation between the two communication channels that comprise the data. For example, duplexer 328 can perform several different filtering techniques to ensure adequate frequency separation between the two communication channels. Accordingly, duplexer 328 is configured to solve LO leakage and image problems such that the data can be properly transmitted and received over the dual channel wireless link.

In step 722, the two communication channels that comprise the data are substantially simultaneously communicated over the dual channel wireless link from a common antenna. During communication of the two communication channels, the ODU can employ several different methods to substantially simultaneously transmit the two communication channels over the dual channel wireless link. For example, the ODU can employ a low IF transmission option, a non-symmetric transmission option, a symmetric transmission, or the like. The ODU can also employ any combination of the aforementioned processes to determine which transmission option is optimal to overcome problems, such as LO leakage, image problems, intermodulation between the communication channels, continuous wave (CW) interference, and noise floors, and to meet ETSI standards. Thus, the dual channel wireless link may have a link capacity that is approximately double the capacity of a wireless link associated with a conventional all ODU configuration.

CONCLUSION

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. An outdoor communication unit (ODU) for implementation within an all ODU microwave backhaul system, comprising:
   a dual channel modem assembly configured to modulate/demodulate data that is to be communicated over a dual channel wireless link, wherein the data comprises a first communication channel and a second communication channel;
   a processor configured to improve a quality of the data by performing mathematical manipulation techniques on the data;
   a filter configured to attenuate frequencies of the data that are higher than a to-determined cutoff frequency;
   a single conversion block configured to perform digital-to-analog and analog-to-digital conversions of the data,
      wherein the dual channel modem assembly is further configured to substantially simultaneously drive the first and second communication channels through the single conversion block and over the dual channel wireless link; and
   a duplexer configured to facilitate the substantially simultaneous communication of the first and second communication channels over the dual channel wireless link by optimizing a frequency separation between the first and second communication channels.

2. The ODU of claim 1, wherein the dual channel modem assembly is further configured to support at least one of: an Ethernet service, a time-division multiplexing (TDM) service, and a control data that is aggregated over a radio link.

3. The ODU of claim 1, wherein the mathematical manipulation techniques performed by the processor include at least one of a pre-distortion process and an adaptive digital pre-distortion process.

4. The ODU of claim 1, wherein the dual channel wireless link has a link capacity that is approximately double a capacity of a wireless link associated with a conventional all ODU configuration.

5. The ODU of claim 4, wherein each of the first and second communication channels are configured to support an approximately 112 MHz wide channel, and wherein the dual channel modem assembly is further configured to support a constellation of at least approximately 2048 quadrature amplitude modulation (QAM).

6. The ODU of claim 1 wherein the filter is at least one of a low-pass filter and a pre-emphasis filter.

7. The ODU of claim 1, wherein the duplexer is configured to ensure that communication of the first and second communication channels over the dual channel wireless link satisfies European Telecommunications Standards Institute (ETSI) standards by substantially eliminating LO leakage, image problems, intermodulation between the first and second communication channels, continuous wave (CW) interference, and noise floors.

8. The ODU of claim 1, wherein the first and second communication channels are communicated over the dual channel wireless link according to at least one of: an asymmetric transmission option, a symmetric transmission and a low IF transmission option.

9. A split outdoor communication unit (ODU) microwave backhaul system, comprising:
an indoor communication unit (IDU), having a modem assembly and an N-Plexer, configured to perform modulation/demodulation of data and to perform a conversion of the data, wherein the data comprises a first communication channel and a second communication channel;
an ODU, having a processor, a conversion block and a duplexer, configured to facilitate substantially simultaneous communication of the first and second communication channels over a dual channel wireless link; and
a dual channel communication pathway, communicably coupled between the IDU and the ODU, configured to communicate the data between the IDU and the ODU over two communication channels,
wherein the modem assembly is configured to substantially simultaneously drive the first and second communication channels over the dual channel communication pathway and over the dual channel wireless link.

10. The split ODU microwave backhaul system of claim 9, wherein the processor is configured to improve a quality of the data by performing at least one of a pre-distortion process and an adaptive digital pre-distortion process.

11. The split ODU microwave backhaul system of claim 9, wherein the duplexer is configured to optimize a frequency separation between the first and second communication channels prior to communication of the first and second communication channels over the dual channel wireless link.

12. The split ODU microwave backhaul system of claim 9, wherein the dual channel wireless link has a link capacity that is approximately double a capacity of a wireless link associated with a conventional split ODU configuration.

13. The split ODU microwave backhaul system of claim 11, wherein the duplexer is further configured to ensure that communication of the first and second communication channels over the dual channel wireless link satisfies European Telecommunications Standards Institute (ETSI) standards by substantially eliminating LO leakage, image problems, intermodulation between the first and second communication channels continuous wave (CW) interference, and noise floors.

14. The split ODU microwave backhaul system of claim 9, wherein the modem assembly is configured to support channel bonding by combining two or more network interfaces to increase throughput.

15. The split ODU microwave backhaul system of claim 9, wherein the modem assembly is configured to support at least one of single chip cross polarization interference cancellation (XPIC), multiple-input and multiple-output (MIMO) spatial multiplexing, and radio optimized network planning.

16. The split ODU microwave backhaul system of claim 9, wherein the modem assembly is further configured to support at least one of a multiple-input and multiple-output (MIMO) spatial multiplexing technique and a radio optimized network planning technique.

17. A method of communicating two communication channels over a dual channel wireless link, comprising:
receiving, at an outdoor communication unit (ODU), data having a first communication channel and a second communication channel;
modulating/demodulating the data;
performing a mathematical manipulation technique on the data to improve a quality of the data;
converting the data from an analog domain to a digital domain;
upconverting the data to RF;
optimizing a frequency separation between the first and second communication channels; and
communicating the first and second communication channels substantially simultaneously over the dual channel wireless link, from a common antenna.

18. The method of claim 17, wherein the modulating/demodulating is performed by a dual channel modem assembly located at the ODU, and wherein the dual channel modem assembly is configured to substantially simultaneously drive the first and second communication channels through a single conversion block and over the dual channel wireless link.

19. The method of claim 17, wherein the modulating/demodulating is performed by a modem assembly located at an indoor communication unit (IDU), and wherein the modem assembly is configured to substantially simultaneously drive the first and second communication channels over a dual channel communication pathway, coupled between the IDU and the ODU, and over the dual channel wireless link.

20. The method of claim 17, wherein the mathematical manipulation technique includes at least one of a pre-distortion process and an adaptive digital pre-distortion process and a filtering process.

* * * * *

UNITED STATES PATENT AND TRADEMARK OFFICE
CERTIFICATE OF CORRECTION

PATENT NO. : 9,106,415 B2  
APPLICATION NO. : 13/626108  
DATED : August 11, 2015  
INVENTOR(S) : Sturkovich et al.

Page 1 of 1

It is certified that error appears in the above-identified patent and that said Letters Patent is hereby corrected as shown below:

Claims

Column 20, Line 37, Claim 1. Please replace "to-determined" with --pre-determined--.

Column 21, Line 7, Claim 7. Please replace "LO leakage" with --local oscillator (LO) leakage--.

Column 22, Line 1, Claim 13. Please replace "LO leakage" with --local oscillator (LO) leakage--.

Column 22, Line 29, Claim 17. Please replace "to RF," with --to radio frequency (RF),--.

Signed and Sealed this
Twenty-sixth Day of January, 2016

Michelle K. Lee
*Director of the United States Patent and Trademark Office*